US006434610B1

United States Patent
Wahl

(10) Patent No.: US 6,434,610 B1
(45) Date of Patent: Aug. 13, 2002

(54) MANAGEMENT OF MEMORY UNITS OF DATA STREAMING SERVER TO AVOID CHANGING THEIR CONTENTS BY EMPLOYING A BUSY LIST OF ALLOCATED UNITS FOR EACH CONTENT AND A FREE LIST OF NON-ALLOCATED UNITS

(75) Inventor: Stefan Wahl, Schwieberdingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/350,160

(22) Filed: Jul. 9, 1999

(30) Foreign Application Priority Data

Jul. 14, 1998 (DE) .......................... 198 31 516

(51) Int. Cl.[7] .............................................. G06F 15/16
(52) U.S. Cl. ...................... 709/219; 709/203; 709/223; 709/224; 709/226; 709/229; 709/233
(58) Field of Search ................................ 709/203, 219, 709/223, 224, 226, 229, 233; 370/254; 725/92, 93, 95

(56) References Cited

U.S. PATENT DOCUMENTS

| 5,515,428 A | * | 5/1996 | Sestak et al. ............... 379/266 |
| 5,550,982 A | * | 8/1996 | Long et al. ................. 709/219 |
| 5,625,819 A | * | 4/1997 | Hoffer, Jr. .................. 707/202 |
| 5,631,694 A |   | 5/1997 | Aggarwal et al. |
| 5,652,865 A | * | 7/1997 | Rawlings, III ............. 711/171 |
| 5,734,119 A | * | 3/1998 | France et al. ................ 84/622 |
| 5,768,520 A |   | 6/1998 | Dan et al. |
| 5,768,681 A |   | 6/1998 | Dan et al. |
| 6,230,200 B1 | * | 5/2001 | Forecast et al. ........... 709/226 |

FOREIGN PATENT DOCUMENTS

| EP | 0 696 872 A2 | 2/1996 |
| EP | 0 735 758 A1 | 10/1996 |
| EP | 0 750 425 A2 | 12/1996 |
| EP | 0 753 966 A2 | 1/1997 |
| EP | 0 759 676 A2 | 2/1997 |
| EP | 0 780 758 A2 | 6/1997 |
| EP | 0 788 280 A2 | 8/1997 |

OTHER PUBLICATIONS

The IVOD Berlin Project: Access Technology for Service Provisioning, R. Heidemann, Alcatel Telecommunications Review, 3rd Quarter 1996, pp. 196 to 200.

* cited by examiner

Primary Examiner—Zarni Maung
Assistant Examiner—Nabil El-Hady
(74) Attorney, Agent, or Firm—Sughrue Mion, PLLC

(57) ABSTRACT

A procedure for operating a server (SERV) that supplies subscribers with data streams of different contents (CONT1 to CONT3), as well as a server and a control unit for executing the procedure. The contents (CONT1 to CONT3) are each stored in a memory unit or in several memory units of the server, and in order to supply a subscriber (SUB1 to SUB8) with a data stream of a particular content, the particular content is read out from the memory unit or from one of the memory units in which the content is stored, and sent to the subscriber as a data stream. A Busy list is set up for each of the contents (CONT1 to CONT3) stored in the memory units (DSD1 to DSD5) of the server (SERV). Each memory unit (DSD1 to DSD4) in which a content is stored, is allocated to the Busy list of the content stored in it. Each memory unit (DSD5) that is not at that time needed for supplying a subscriber, is allocated to a Free list. If a further memory unit is needed in order to supply subscriber with a particular content, a memory unit allocated to the Free list is selected for this purpose, and it is first attempted to select a memory unit allocated to the Free list that is also allocated to the Busy list of the particular content.

11 Claims, 3 Drawing Sheets

Fig.1

MANAGEMENT OF MEMORY UNITS OF DATA STREAMING SERVER TO AVOID CHANGING THEIR CONTENTS BY EMPLOYING A BUSY LIST OF ALLOCATED UNITS FOR EACH CONTENT AND A FREE LIST OF NON-ALLOCATED UNITS

BACKGROUND OF THE INVENTION

The invention relates to a procedure for operating a server which supplies subscribers with data streams of different contents, as well as a server and a control unit employing this procedure.

The invention assumes a Video-on-Demand system as described e.g. in EP 0696872 A2.

Such a Video-on-Demand system consists of a video server connected to a large number of subscribers via a communication network. Each subscriber is provided with a set-top box connected to a television set. The video server is provided with a large number of memory units, in which video films of different contents are stored. The memory units feature video replay facilities which replay these video data sets and send the stream of video data so generated to a requesting subscriber. The video server is also provided with a control unit which allocates video replay resources to a requesting subscriber, and initiates the transmission of the requested video data stream to the requesting subscriber via the allocated resources. Resources no longer needed for a subscriber are marked as free. The allocation of such free resources is then carried out with the objective of sending a video data stream in parallel to the maximum number of subscribers, thus optimising the utilisation of the allocated resources.

SUMMARY OF THE INVENTION

It is an object of the invention to improve the efficiency of a server which supplies subscribers with data streams of different contents.

This task is solved by a procedure for operating a server (SERV) which supplies subscribers (SUB1 to SUB8) with data streams of different contents (CONT1 to CONT3), where during the procedure the different contents (CONT1 to CONT3) are each stored in at least one memory unit of the server and in order to supply a subscriber (SUB1 to SUB8) with the data stream of a particular content, the particular content is read back from a memory unit in which it is stored, and sent to the subscriber as a data stream, said method comprising the steps of: setting up a Busy list for each of the contents (CONT1 to CONT3) stored in the memory units (DSD1 to DSD9) of the server (SERV), with each memory unit (DSD1 to DSD4, DSD6 to DSD9) in which a content is stored being allocated to the Busy list of the content stored in it, and each memory unit (DSD5 to DSD9) which at that time is not needed for supplying a subscriber being allocated to a Free list, and selecting one of the memory units allocated to the Free list if a further memory unit becomes necessary for supplying a subscriber with a particular content, while first attempting to select a memory unit allocated to the Free list which is also allocated to the particular content's Busy list.

This invention is based on the idea of controlling the memory units in which the different contents are stored, with the aid of two kinds of lists: a Busy list set up for each available content and to which are allocated those memory units in which the corresponding content is stored, and a Free list to which are allocated those memory units not needed at that time. Examples of contents are video films, music or other data which might be of interest to a subscriber. If, in order to supply a subscriber with a particular content, further memory units are needed in which the particular content is stored, the first memory units selected for this purpose are those memory units from the Free list which are also allocated to the particular content's Busy list.

This has the advantage that the content of a memory unit needs to be changed far less often. On the one hand, such content changes are time-and resources-intensive. On the other, the memory unit is blocked whilst the content is changed. Thus, server operation in accordance with the invention significantly increases the server's performance.

Further advantageous configurations of the invention will be apparent from the description below and the appended claims.

It is especially advantageous to represent the memory units through objects and to set up the Free list and the Busy lists by concatenating these objects. This results in a data structure which allows the operational procedure to be simply executed.

BRIEF DESCRIPTION OF THE DRAWINGS

In the following, the invention is explained with the aid of several implementation examples and with reference to the attached diagrams.

DETAILED DESCRIPTION OF THE INVENTION

Figure 1:
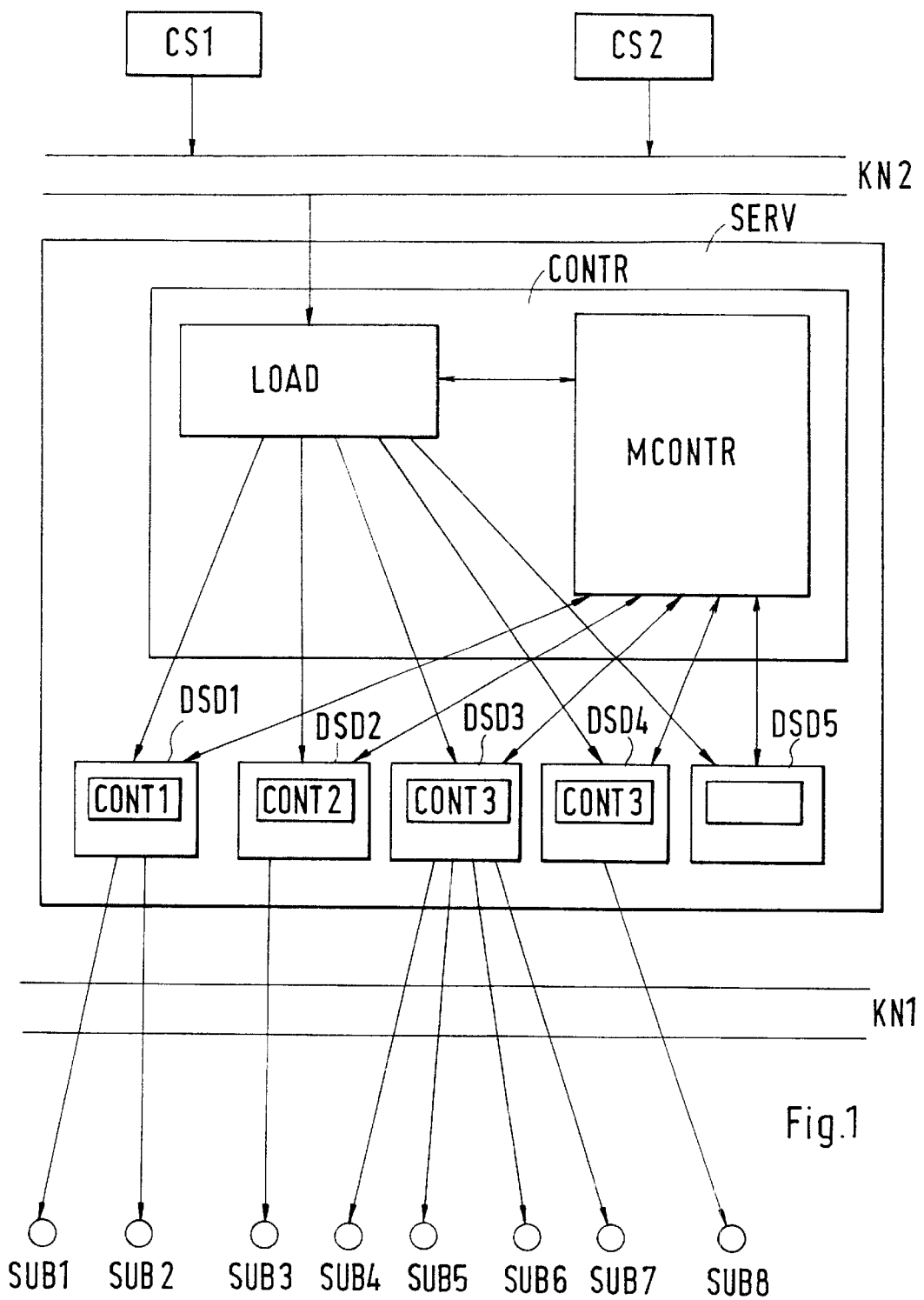
FIG. 1 shows a block diagram of a system with a server in accordance with the invention and a control unit in accordance with the invention.

FIG. 1 shows the servers SERV, CS1 and CS2, the communication networks KN1 and KN2 and the subscribers SUB1 to SUB8. The subscribers SUB1 to SUB8 are connected via the communication network KN1 with the server SERV, which in turn is connected via the communication network KN2 with the servers CS1 and CS2.

The servers SERV, CS1 and CS2 are each made up of specially designed computer workstations. Server SERV stores data sets with different contents, which are read out by server SERV and sent on request, as a continuous data stream, across the communication network KN1 to the subscribers SUB1 to SUB8.

Each data set consists of video data which describe a particular content, for example the video data of a special video film. However, it is also possible for a data set to be put together from multimedia data, audio data or other data, which are transmitted essentially synchronously by the terminal devices of subscribers SUB1 to SUB8 via the appropriate output method to the relevant subscriber.

The number of servers CS1 to CS2 is chosen arbitrarily in this example. Servers CS1 to CS2 store a large number of data sets with different contents, of which each individual content can be downloaded on request across the communication network KN2 into the server SERV or into other servers, similarly constructed.

The number of subscribers SUB1 to SUB8 is chosen arbitrarily in this example. Each of the subscribers SUB1 to SUB8 has a terminal device for communicating with the server SERV in the form of a video replay set, for example a television set, equipped with a set-top box for accessing the server SERV. Such a terminal device and an associated communication network which connects this terminal device with the server SERV is described, for example, in the paper "The IVOD Berlin Project: Access Technology for Service Provisioning, R. Heidemann, Alcatel Telecommunications Review, 3rd Quarter 1996, pp. 196 to 200.

It is also possible for the subscribers SUB1 to SUB8 to have a terminal device in the form of a computer workstation, provided with peripheral modules for communicating via the communication network KN1 and for outputting contents supplied by the server SERV. Such terminal devices are, for example, networked computers, personal computers or information terminals.

The communication network KN1 consists of an access network, across which the terminal devices of subscribers SUB1 to SUB8 are connected via hybrid fibre coax, via cable modems, via ISDN (Integrated Service Digital Network) or via ADSL (Asymmetrical Digital Subscriber Line). In particular, if a large number of subscribers are connected to the communication network KN1, it is advantageous for the communication network KN1 to be provided with several access networks, under certain circumstances of different types, and with a backbone network that connects the access networks with each other and with the server SERV. A suitable choice for a backbone network would be, for example, an ATM (Asynchronous Transfer Mode) or an SDH (Synchronous Digital Hierarchy) network.

It is also possible for the terminal devices of subscribers SUB1 to SUB8 to be connected to the communication network KN1 across an ATM interface. Where the terminal device is a computer workstation, it is of further advantage if the communication network KN2 is an IP network (IP= Internet protocol), for example a so-called Fast Internet.

The communication network KN2 is a broad-band data network, for example an ATM, FDDI or DQDB network (FDDI=Fibre Distributed Data Interface, DQDB= Distributed Queue Dual Bus).

From a functional viewpoint, the server SERV features several memory units, of which FIG. 1 shows as an example the memory units DSD1 to DSD5, and a control unit CONTR, which in turn features a memory control unit MCONTR and a loading unit LOAD.

Each of the memory units DSD1 to DSD5 is provided with a memory for storing a content. It is advantageous for the memory units DSD1 to DSD5 to have physically separate memory modules, each of which has sufficient capacity to store a content, e.g. a video film, preferably in digital form. Thus, for example, they may each be provided with a disc drive or digital memory chips permanently allocated to them. It is, of course, also possible for the memory units DSD1 to DSD5 to have allocated to them logical memory domains in a common memory module.

In each of the memory units DSD1 to DSD4 there is stored, for example, a content CONT1, CONT2, CONT3 or CONT3, and no content is stored in the memory unit DSD5. The memory units DSD1 to DSD5 are accessed by replay resources. When these are activated, they read out the content stored in the relevant memory unit, reproduce it and send the continuous data stream so generated across the communication network KN1 to one of the subscribers SUB1, or in parallel to several of them. It is advantageous for replay resources to be permanently allocated to a memory unit, each memory unit thus being provided with its own replay resources. The content of a memory unit is so stored that multiple parallel read-out is possible. Hence, several subscribers can be served simultaneously by one memory unit. Thus, for example, memory unit DSD1 supplies subscribers SUB1 and SUB2 with the content CONT1, memory unit DSD2 supplies subscriber SUB3 with the content CONT2 and memory units DSD3 and DSD4 supply subscribers SUB4 to SUB8 with the content CONT3.

The control unit CONTR controls the preparation of contents and the supply of subscribers with contents. It is also possible for the control unit to be responsible not for one server but for several servers, and to exercise these functions for all these servers centrally. In this event, such a control unit can also form part of a central control node that controls the preparation of contents via a whole group of servers.

The memory control unit MCONTR controls the allocation of memory units DSD1 to DSD5 to subscribers. If the memory control unit MCONTR receives a request message from a subscriber in which the latter requests a particular content, the memory control unit MCONTR selects one of the memory units DSD1 to DSD5 and causes it to supply the requesting subscriber with the requested content. If it is necessary, for this purpose, to load a new content into the selected memory unit, it sends an appropriate control message to the loading control unit LOAD.

The loading control unit LOAD loads contents into the memory units DSD1 to DSD5. For this purpose it requests the contents from the central servers CS1 to CS2, receives them via the broad-band network KN2 and then loads them into the appropriate memory unit. If the content that needs to be loaded is already stored in another memory unit of server SERV, it copies the content from this memory unit into the memory unit that needs to be loaded. It is also possible for the loading control unit LOAD to be provided with a database in which copies of contents are stored, and contents are copied from this database into memory units.

The detailed operating method of the memory control unit MCONTR will now be explained with reference to FIG. 2.

The memory control unit MCONTR allocates memory units to subscribers, and for this purpose carries out essentially the following functions: it selects a memory unit whose task it is to supply the requested content to the requesting subscriber. The objective of this selection is to optimise the utilisation of the memory units' capacity. It also ascertains which memory units are free at that time and are not supplying a subscriber with a content, in order to store in these free memory units new contents or further copies of contents. The objective of selecting between free memory units is to avoid, as far as possible, changing the content of memory units.

In order to carry out these functions, the memory control unit MCONTR maintains two types of lists. The first is a Busy list for each content available in the server SERV. The Busy lists hold a record of those memory units in which the relevant content is stored at that time. The second is a Free list, to which a memory unit is added as soon as it no longer supplies any subscribers with contents. It is advantageous to implement these lists as a data structure in which objects are concatenated into lists, as shown in FIG. 2. Of course, it is also possible to implement these lists in some other way, for example as separate lists in a database.

Figure 2:
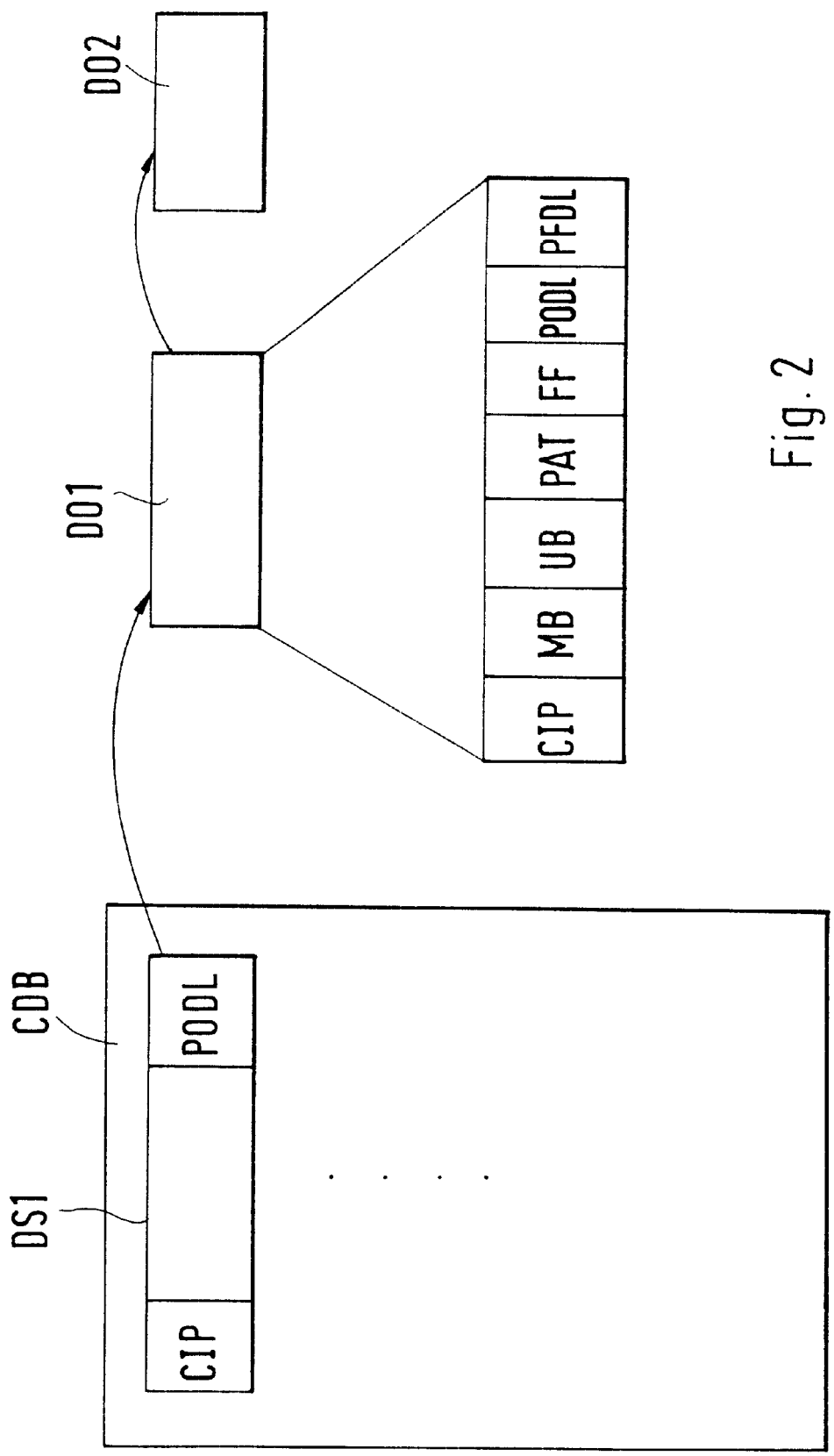
FIG. 2 shows a functional representation of a section from a data structure used by the server as per FIG. 1.

FIG. 2 shows a content database CDB and two objects DO1 and DO2.

Each of the objects DO1 and DO2 represents a memory unit. For each of the memory units of server SERV, such an object is controlled by the memory control unit MCONTR. The structure of these objects will now be explained, using object DO1 as an example.

Object DO1 features seven data fields CIP, MB, UB, PAT, FF, PODL and PFDL. The data field CIP contains a content identification password that describes the content stored in the memory unit. The data field MB contains a value that describes the maximum memory unit's bandwidth, i.e. the maximum number of parallel data streams it can provide. The data field UB contains a value that describes how much of the maximum bandwidth is being used at the time. The data field PAT contains a value that describes the projected time till the arrival of another request for the content stored in the memory unit. The data field PODL and PFDL contain pointers that indicate other objects. If no such object is present, these data fields contain a null pointer. The data field PODL contains a pointer to a Busy list and the data field PFDL contains a pointer to the Free list. The data field FF contains a status variable that indicates whether the memory unit stores a content or not.

The content database CDB consists of a list of data sets. Such a data set is stored in this list for each content stored in the server SERV. FIG. 2 shows the data set DS1 as an example of such data sets. Data set DS1 features, inter alia, the data fields CIP and PODL.

Thus, the Busy lists are formed as follows: a data set, for example the data set DS1, is held in the content database CDB for each available content. The data set always points to the first object of the allocated Busy list, which in turn points to the second object etc. The last object in the list contains a null pointer in its data field PODL.

When an additional copy of the content of a memory unit is stored, the associated object is removed from its current Busy list and attached to the Busy list of this content. The pointer in the data field PODL of the old Busy list's preceding object is overwritten with the object's corresponding pointer. The null pointer of the last object in the new Busy list is overwritten with a pointer to this object, and the null pointer is written into the data field PODL of this object, so that this object now becomes the new last object in this Busy list.

When a memory unit no longer makes its content available to subscribers, the object representing it is inserted into the Free list. Insertion into the Free list does not mean here that the content stored in the memory unit is deleted, but that the memory unit is a potential candidate for having the content stored in it replaced by another content. As soon as the memory unit is again allocated to a subscriber and makes its content available to him, it is removed once again from the Free list.

Figure 3:
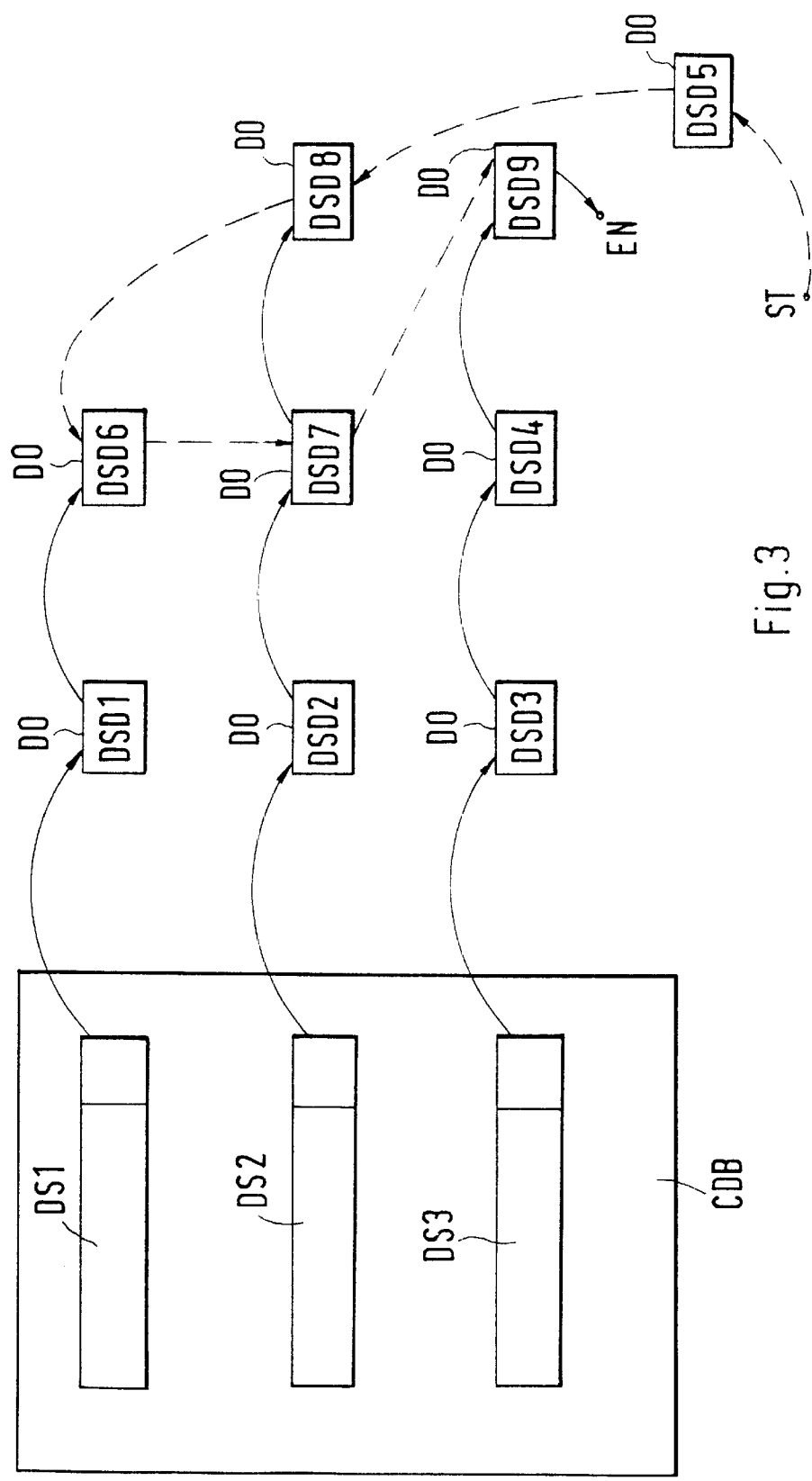
FIG. 3 shows a detailed functional representation of the data structure used by the server as per FIG. 1.

The adding and deleting of objects to and from the Free list and Busy lists will now be explained with reference to FIG. 3:

FIG. 3 shows the content database CDB with the data set DS1 and data sets DS2 and DS3, as well as nine objects DO which represent the memory units DSD1 to DSD5 and the memory units DSD6 to DSD9 of the server SERV, not shown in FIG. 1. Memory units DSD6 to DSD9 store the contents CONT1, CONT2, CONT2 or CONT3, however at this time the contents are not supplied to any subscribers.

The data sets DS1, DS2, and DS3 are allocated to the contents CONT1, CONT2, or CONT3. The data set DS1 points to the object representing the memory unit DSD1, which in turn points to the object representing the memory unit DSD6. This forms the Busy list for the content CONT1, to which the memory units DSD1 and DSD6 are thus allocated. In the same way, data sets DSD2 and DSD3 are concatenated with objects representing the memory units DSD2, DSD7 and DSD8, OR DSD3, SD4 and DSD9, which forms the Busy lists for the contents CONT2 and CONT3. No content has yet been loaded into memory unit DSD5, thus it is not allocated to any of the Busy lists. The free list is formed by concatenating the objects allocated to memory units DSD5, DSD8, DSD6, DSD7, and DSD9 between a starting point ST and an end point EN.

Objects such as those of memory unit DSD5, allocated to the Free list and to no Busy list, for example because they do not yet store any content, are arranged at the beginning of the Free list.

The following two possibilities exist for memory units allocated to the Free list and to one of the Busy lists:

They are instructed to supply a subscriber with their content, and are thus removed from the Free list.

They are required to supply a subscriber with a content other than the one stored in them. Hence another content is loaded into them, thus they are allocated to a different Busy list and are removed from the Free list.

It is also possible for memory units to be loaded by the memory control unit MCONTR with other contents on the basis of statistical calculations, which estimate in advance the bandwidth demanded by a particular content; hence they are allocated to another Busy list but remain in the Free list. Thus it is possible to respond very rapidly to subscribers' requests.

When a subscriber requests a content to be supplied, the control unit MCONTR first selects the first object from the Busy list allocated to the requested content. If the available bandwidth of the memory unit represented by this object is insufficient to meet the request, the next object in the Busy list is selected and so on. This achieves full utilisation of the bandwidth available to a memory unit, before the next memory unit in the Busy list is used. In this way, the maximum number of free memory units are available to the next request.

If a selected object is one that is also allocated to the Free list, it is removed from the Free list. If no further object is contained in the requested content's Busy list, the first object in the Free list is selected and the requested content loaded into the memory unit represented by this object. The object is attached to the end of the Busy list and removed from the Free list. If the memory units which already supply subscribers with the content have no more free capacity, the result is that the objects that are automatically selected first from the Free list are also allocated to the content's Busy list. Only then is an object selected from the Free list, for which a change of content is necessary. This minimises the number of content changes.

It is an advantage not to allocate memory units which become free to the end of the Free list, but to determine their position within the Free list in accordance with the following calculations:

If a memory unit is not allocated to any Busy list, it is placed at the beginning of the Free list. Such a situation is indicated by the status variable recorded in the data field FF. The beginning of the Free list is thus constituted from the objects that represent such memory units.

The remaining objects in the Free list are sorted in accordance with the probability that the content of the memory units represented by them would be needed next or not. If this probability is high, then the associated object is placed at the end of the Free list. Insertion in the Free list is controlled here via the parameter recorded in the data field PAT, which is a measure of accessing probability. This parameter is recalculated each time the object in which it is recorded is allocated to the Free list.

What is claimed is:

1. A method of operating a Server which supplies subscribers with data streams of different contents, each particular content of the different contents being supplied in a data stream to one or more of the subscribers from at least one of a plurality of memory units of the server, said method comprising:

setting up a Busy list for each of the different contents stored in the memory units of the server, with each memory unit of the memory units, in which the particular content is stored, being allocated to the Busy list of the particular content, and each of the memory units not needed for supplying data streams to any of the subscribers being allocated to a Free list, and when a further one of the memory units is necessary for supplying one of the data streams corresponding to a given content of the different contents to one of the subscribers, selecting one of the memory units allocated to the Free list, wherein the selecting step includes first attempting to select a memory unit allocated to the Free list which is also allocated to the Busy list of the given content.

2. A method as per claim 1, further comprising:

in response to a request for the supplying of one of the subscribers with a data stream corresponding to the given content, examining the memory units in accordance with a sequential arrangement order in the Busy list of the given content;

determining whether any of the memory units in the Busy list of the given content still has capacity to perform the supplying; and selecting the first one of the memory units in the Busy list of the given content, having the capacity to perform the supplying, to meet the request.

3. A method as per claim 1, characterised in that a memory unit, when allocated to one of the Busy lists, is allocated to the end of this Busy list.

4. A method as per claim 1, characterised in that a memory unit, when allocated to the Free list, is allocated to the end of the Free list.

5. A method as per claim 1, wherein a memory unit, when allocated to the Free list, is placed within the Free list in accordance with the probability that the memory unit would be required to supply to a subscriber the particular content stored in the memory unit.

6. A method as per claim 1, wherein when a memory unit selected from the Free list is not allocated to the Busy list of a particular content, the particular content is copied from a memory of the server into the selected memory unit.

7. A method as per claim 1, wherein when a memory unit selected from the Free list is not allocated to the Busy list of a particular content, the particular content is loaded from a central server into the selected memory unit.

8. A method as per claim 1, wherein each memory unit is represented by an object and the Free list and the Busy list are set up through a concatenation of these objects.

9. A method as per claim 8, wherein for each particular content stored in one of the memory units of the server, a data set is recorded in a content database and provided with a pointer to the first object of the Busy list of the particular content.

10. A server which serves to supply subscribers with data streams of different contents, the server being equipped with several memory units for storing contents, which on request are read out and sent to subscribers as data streams, and with a memory control unit for allocating memory units to subscribers, wherein the memory control unit is so designed that it sets up a Busy list for each content stored in the server's memory units, allocates each memory unit in which a content is stored to the Busy list of the content stored in it, allocates each memory unit which at that time is not needed for supplying a subscriber to a Free list, and if a further memory unit is needed for supplying a subscriber with a particular content, selects for this purpose a memory unit allocated to the Free list, first attempting to select a memory unit allocated to the Free list which is also allocated to the particular content's Busy list.

11. A control unit for controlling one or several servers which serve to supply subscribers with data streams of different contents and for this purpose feature several memory units for storing contents, which on request are read out and sent to subscribers as data streams, and the control unit is equipped with a memory control unit for allocating memory units to subscribers, wherein the memory control unit is so designed that it sets up a Busy list for each of the contents stored in the memory units, allocates each memory unit in which a content is stored to the Busy list of the content stored in it, allocates each memory unit which at that time is not needed for supplying a subscriber to a Free list, and when a further memory unit is needed for supplying a subscriber with a particular content, selects for this purpose a memory unit allocated to the Free list, first attempting to select a memory unit allocated to the Free list which is also allocated to the particular content's Busy list.

* * * * *